United States Patent [19]

Nogossek

[11] Patent Number: 5,302,106
[45] Date of Patent: Apr. 12, 1994

[54] DOUBLE-WORM EXTRUDER WITH POLYGONAL-DISK KNEADER

[75] Inventor: Alfred Nogossek, Salzgitter, Fed. Rep. of Germany

[73] Assignee: Friedrich Theysohn GmbH, Langenhagen, Fed. Rep. of Germany

[21] Appl. No.: 911,602

[22] Filed: Jul. 10, 1992

[30] Foreign Application Priority Data

Jul. 11, 1991 [DE] Fed. Rep. of Germany ....... 4122912

[51] Int. Cl.$^5$ .............................................. B29C 47/00
[52] U.S. Cl. ...................................... 425/204; 366/82; 366/85; 425/208; 425/382.3
[58] Field of Search ................ 366/82, 85, 90; 425/204, 208, 209, 382.3, 382.4, 461

[56] References Cited

U.S. PATENT DOCUMENTS

| | | | |
|---|---|---|---|
| 3,382,536 | 5/1968 | Fritsch et al. | 366/82 |
| 3,423,074 | 1/1969 | Loomans | 425/204 |
| 3,461,497 | 8/1969 | Geyer | 366/82 |
| 3,497,912 | 3/1970 | Fischer | 425/204 |
| 4,234,259 | 11/1980 | Wiedmann et al. | 366/85 |
| 4,343,929 | 8/1982 | Sugio et al. | 366/85 |
| 4,408,887 | 10/1983 | Yamaoka | 366/82 |
| 4,824,256 | 4/1989 | Haring et al. | 366/85 |
| 4,900,156 | 2/1990 | Bauer | 366/85 |
| 4,940,329 | 7/1990 | Dienst | 366/82 |
| 5,048,971 | 9/1991 | Wall et al. | 366/85 |

FOREIGN PATENT DOCUMENTS

| | | |
|---|---|---|
| 813154 | 9/1951 | Fed. Rep. of Germany . |
| 2533195 | 2/1977 | Fed. Rep. of Germany ...... 425/204 |
| 3430885 | 2/1986 | Fed. Rep. of Germany . |
| 3841729 | 3/1990 | Fed. Rep. of Germany . |
| 1559048 | 3/1969 | France . |
| 2342152 | 9/1977 | France . |
| 2635044 | 2/1990 | France . |
| 1110881 | 4/1968 | United Kingdom . |
| 1126144 | 9/1968 | United Kingdom . |

Primary Examiner—Charles S. Bushey
Attorney, Agent, or Firm—Herbert Dubno

[57] ABSTRACT

A double worm extruder for kneading units along the worms which are rotatable in the same sense. Each kneading unit has three or more circumferentially offset polygonal disks which have sealing surfaces at diametrically opposite locations closely juxtaposed with the inner wall of the housing. These sealing disks are flanked by edges which are inclined to the axes of the worms so as to insure greater flow cross sections past the disks and thereby avoid shear peaks in the extruded material and thermal decomposition thereof.

7 Claims, 4 Drawing Sheets

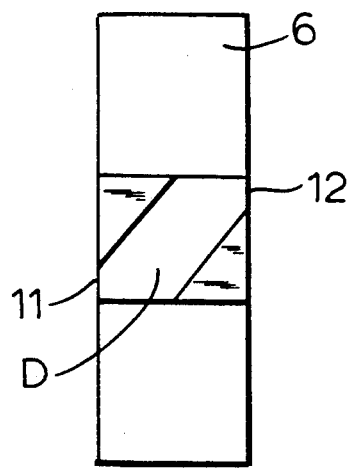
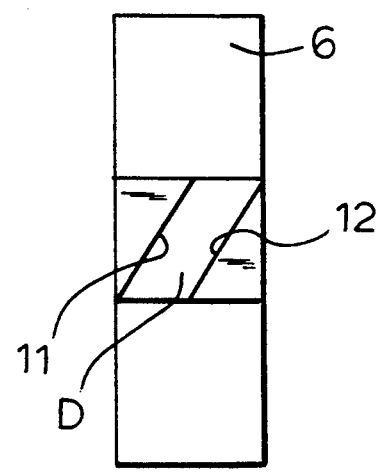
FIG.5    FIG.6
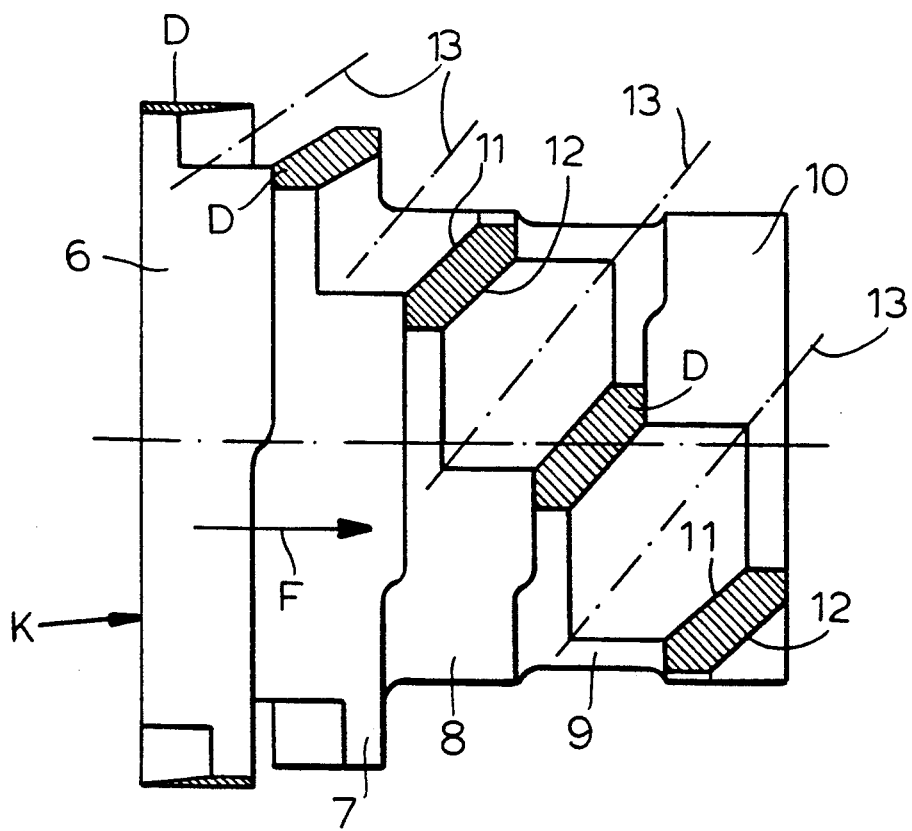
FIG.7

DOUBLE-WORM EXTRUDER WITH POLYGONAL-DISK KNEADER

FIELD OF THE INVENTION

My present invention relates to a double-worm or double-screw extruder having an elongated worm or screw housing in which a pair of screws or worms are rotatable in the same sense to advance a plastifiable or thermoplastifiable material toward a discharge end of the extruder.

More particularly, the invention relates to a double-worm extruder of this type which is provided along the screws and hence along the path of the plastifiable material of the screw with respective kneading units.

BACKGROUND OF THE INVENTION

From German Patent 813,154, for example, it is known to provide a double worm extruder having two worms rotatable in the same sense of rotation and with which a plastifiable material is subjected to mixing, shear and pressure plastification purposes. The material may be a thermoplastic material which is to be extruded through an extruder head at one end of the extruder to be delivered to an injector at that end for injection molding of the material, or can force the material through a die to form a shaped strand thereof.

In the double worm extruder of this patent, along the worms and at the same axial locations therealong, kneading units are provided, each of which can consist of three or more angularly or circumferentially offset polygonyl disks which at two diametrically opposite locations have diameters which correspond to the diameters of the worm housing so that the disks effectively form a seal with the housing or are closely juxtaposed therewith.

Double worm extruders or compounding machines of this type are used to knead and mix synthetic resin material primarily and the worm constructions are generally matched to the type of materials which are to be subjected to mixing, plastification and shear. The material can be more or less viscous, plastic, pulverulent or granular and the worms can be dimensioned accordingly.

For adjacent operation of the double worm extruder and for high quality extruded products, it is important that the worms insure good and thorough mixing with a minimum of thermal decomposition of the material during its advance through the worm housing.

The worms of the double worm extruder described in German Patent 813,154 have, as noted, kneading units along their length which are intended to improve the mixing material in the worm housing.

Each of these kneading units comprises a multiplicity of axially adjacent but circumferentially and angularly offset polygonyl disks, i.e. disks having a plurality of sides, all of which may be arcuate, analogous to the configuration of a cam.

These disks operate on the material by forming constrictions between themselves and with the cylindrical wall of the worm housing, through which the material can be forced.

The polygonal disks have diametrically opposite sealing surfaces which are provided at the largest transverse dimensions of these disks and are so closely juxtaposed with the wall of the cylinder that they form sealing surfaces with the inner wall of the worm housing. In these regions, therefore, the material cannot be forced past the disk and thus the material must flow around these areas over nonsealing surfaces of the polygon disks.

Since the kneading units are provided adjacent one another at the same axial locations along the worms, the sealing surfaces of the polygon disks of the two kneading units can practically meet between the worms so that here as well the material cannot be forced past the sealing surfaces but must flow around the disks.

The kneading units of the two worms have comparatively small free flow cross sections through which the material can pass. As a consequence, shear spikes can develop, i.e. regions of extremely high shear, with concomitant peaks in heating and the heating can be in excess of that which is desirable for heat sensitive materials so that thermal decomposition can occur at least to a limited extent.

OBJECTS OF THE INVENTION

It is the principal object of the present invention, therefore, to provide an improved double worm extruder of the type having kneading units as described, whereby the drawbacks of these earlier systems are obviated.

Another object of this invention is to provide an improved double worm extruder which is less prone to generate shear spikes or heat peaks in the material displaced through the extruder than earlier systems.

SUMMARY OF THE INVENTION

These objects and others which will become more readily apparent hereinafter are attained, in accordance with the invention by providing, in an extruder of the types described the aforementioned sealing surfaces of the polygon disks so that they have edges extending transverse to the axes of the worms for the sealing surfaces which extend circumferentially and are at least partly inclined to the axes of the worm. The double worm extruder of the invention can comprise:

a worm housing;
a pair of mutually interengaging extrusion worms rotatable in the same sense in the cylinder for plastifying a plastic material and displacing same toward an extrusion end of the housing;
a respective kneading unit along each of the worms and at substantially the same location along the respective worms, the kneading units each comprising:
a plurality of polygon disks disposed one adjacent another along the respective worm and rotatable therewith, each of the disks being formed with two diametrically opposite sealing surfaces juxtaposed with an inner surface of the housing and having an outer diameter corresponding substantially to an inner diameter of the inner surface at locations at which the sealing surfaces are juxtaposed therewith, the sealing surfaces extending generally in a circumferential direction of the respective worm and having edges generally transverse to axial directions of the worm and at least partly inclined to the axes of the respective worm; and
means on the housing for driving the worms and the kneading units in the same sense.

With this construction of the sealing surfaces of the polygon disks, a damming effect of the kneading unit is maintained, but the flow cross section is increased and the flow of the material guided so that thermally detrimental shear peak are eliminated or reduced to the point that significant decomposition does not occur.

The directions in which the edges are inclined can be different or the inclined edges can be parallel, depending upon the requirements. When the inclined edges run in the direction of the displacement of the material, the reduced shear is accompanied by a reduced braking effect and the disks can contribute to the advance of the material through the worm. When the edges are inclined in the opposite direction, they induce a backward movement of the material in the region of the kneading units and contribute to improved mixing. The greater free cross section, however, applies even in this case so that the shear effect at the polygon disks is reduced. The double worm extruder which thus results insures mixing of the material with a significant reduction in the thermal loading.

BRIEF DESCRIPTION OF THE DRAWING

The above and other objects, features and advantages of my invention will become more readily apparent from the following description, reference being made to the accompanying highly diagrammatic drawing in which:

FIGS. 5 and 6 are elevational views showing the inclined edges flanking a sealing surface of a polygon disk in two embodiments;

FIG. 7 is a view similar to FIG. 4 showing a modification of the kneading unit thereof;

SPECIFIC DESCRIPTION

Figure 1:
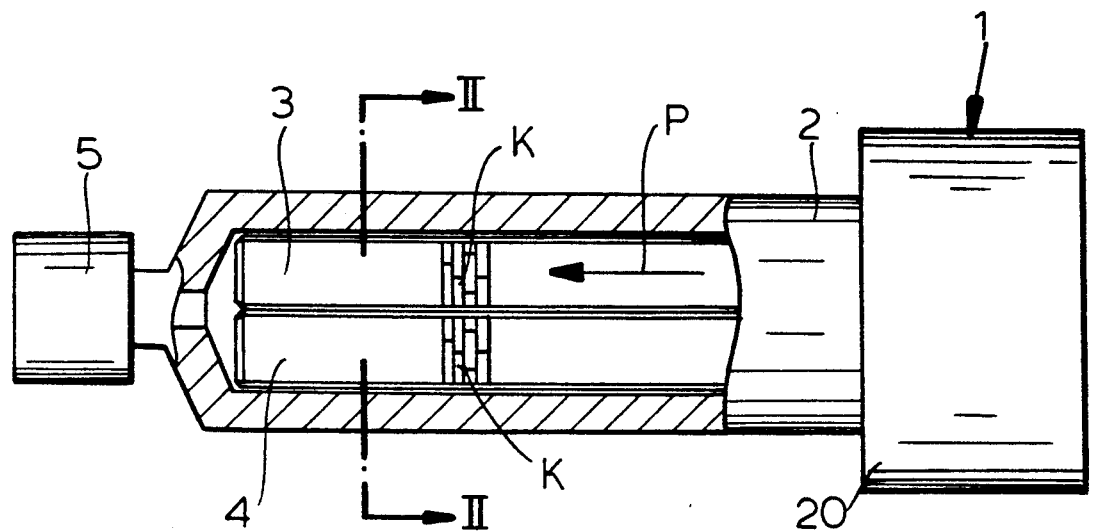
FIG. 1 is a highly diagrammatic cross sectional view of a double worm extruder of the invention.
Figure 2:
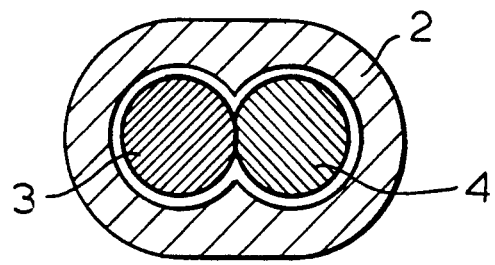
FIG. 2 is a view taken alone the line II—II of FIG. 1 but drawn to a slightly larger scale.

FIG. 1 shows a double worm extruder 1, herein after referred to simply as extruder 1, is highly schematic from and only the parts significant to the invention have been shown and identified.

In the worm housing 2 of extruder 1, a pair of worms and screws 3 and 4 are received and these worms and screws are driven by a drive system 20, not shown in detail, so that they rotate about their respective axes in the same sense. The worm flights or ribs and the direction of rotation is such that the worms advance materials fed at the right hand end of the extruder to the downstream or left hand end of the extruder to the downstream or lefthand end thereof in the direction of the arrow P to an extrusion head 5.

At substantially the same axial location along each worm end 3, 4, as represented by the shaded region K of each worm 3, 4, a respective kneading unit is provided. The kneading units K which may be used have been illustrated in FIGS. 3 to 9.

The other parts of the worms 3 and 4 which effect the displacement of the material and mixing can be conventional in the art and have been neither described nor illustrated.

Figure 3:
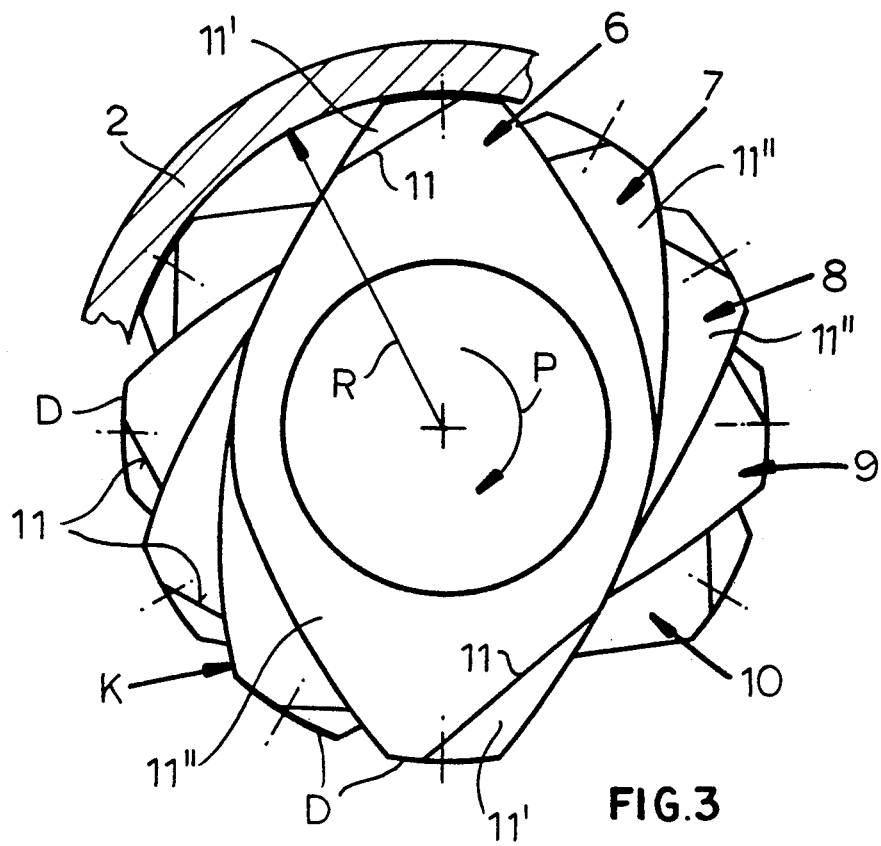
FIG. 3 is an end view of a kneading unit for use in the system of FIGS. 1 and 2 according to the invention, enlarged in scale still further.

In FIG. 3 an end view of a kneading unit K is shown which has five polygon disks 6, 7, 8, 9 and 10. Each of the two worms 3, 4 has at least one such kneading unit K and the kneading units of the two worms are at the same axial location. The two kneading units K thus interengage with one another. The kneading units K are each formed in one piece so that the polygon disks 6 to 10 are cast in one piece with one another, although they can be assembled from separate disks mounted on a common shaft.

The disks 6 to 10 are offset from one another in the circumferential direction and at two diagrammatically opposite sides of each disk a respective sealing surface is provided as represented at D. The distance between each of the sealing surfaces D and the center of the kneading units K corresponds to the radius R of the inner chamber of the worm housing two as will be apparent from FIG. 3. Between the housing two and the sealing surface D, however, a slight clearance may remain to permit rotation of the worm and kneading unit thereon, although flow of material through this clearance is minimal if at all.

Figure 4:
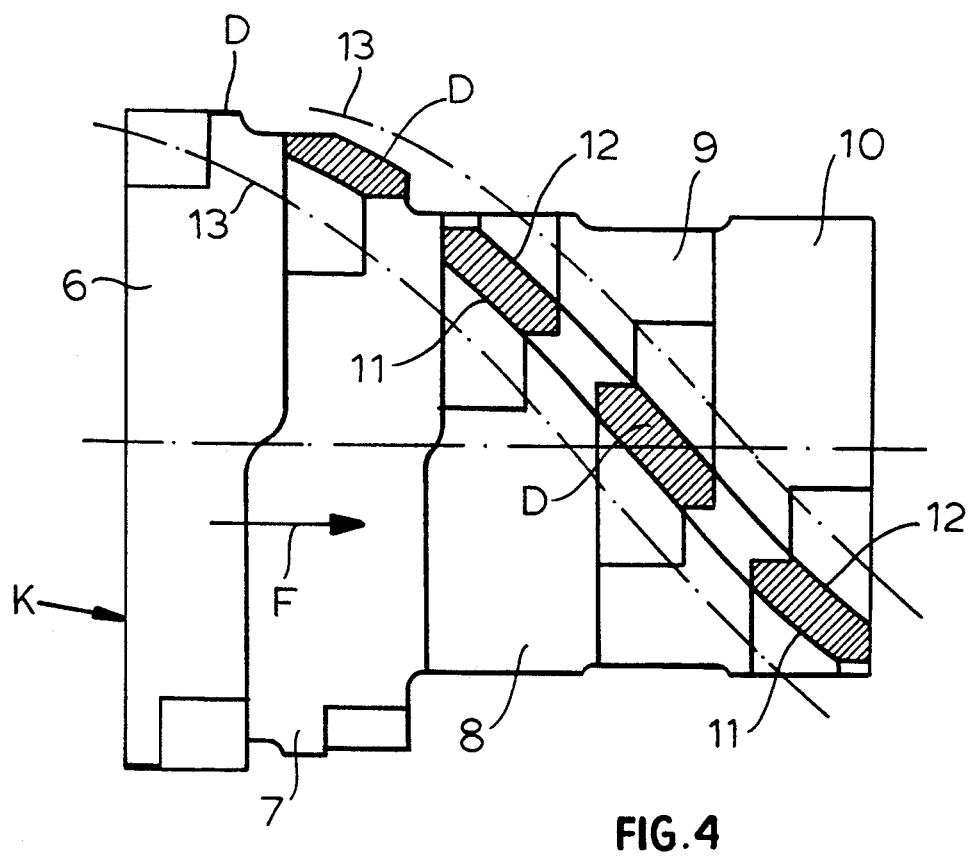
FIG. 4 is a side view of the kneading unit of FIG. 3 to the scale thereof.
Figure 8:
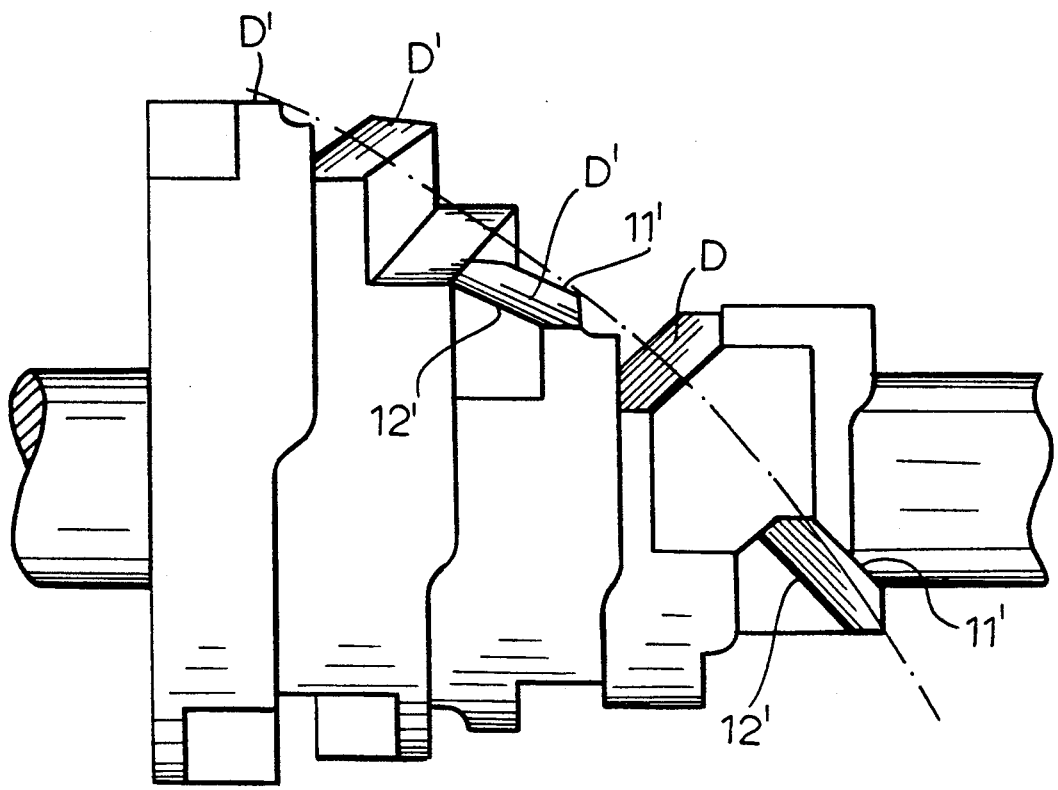
FIG. 8 is another view to FIGS. 4 and 7 illustrating a kneading unit in which the disks have sealing surfaces with edges inclined to the axial direction alternating in opposite directions.
Figure 9:
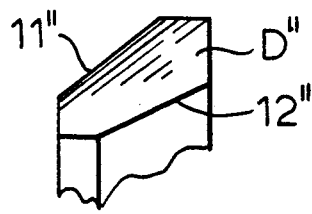
FIG. 9 is a detailed view of a sealing surface showing the inclined edges in an embodiment in which these edges are nonparallel in contrary distinctions to the parallel edges of the embodiments illustrated earlier.

The polygon disks 6 to 10 as is apparent from FIGS. 4, 7 and 8 are so offset in the circumferential direction that the sealing surfaces D lie along a helical line. The sealing surfaces are shaded in FIGS. 4, 7 and 8.

The truncated separated lines between the individual disks 6 to 10 result, upon the formation of the kneading unit K, from transitions between the individual polygon disks.

Each sealing surfaces D is flanked by edges 11 and 12 running transversely to the axial direction of the worms 3 and 4 and these edges 11 and 12 have at least partly an inclined orientation. This is particularly visible from FIGS. 5 and 6 in which only the polygon disk 6 has been illustrated.

The edges 11 and 12 join bevels 11', for example, with the planar faces 11" of the disks. The bevels connect to the sealing surfaces D. The edges 11, 12 are straight lines running from the sealing surfaces to edges of the respective disks.

The other polygon disks 7 to 10 are similarly configured.

In the region of the dot dash lines 13, therefore, there are enlarged flow cross sections for the material which is processed by the extruder. The edges 11 and 12 can, as is apparent from FIG. 5, be partly perpendicular to the axial direction of the worms 3 and 4 and partly inclined thereto. They can, however, as is apparent from FIG. 6 also be so inclined over their entire lengths. The hatched zones in FIGS. 5 and 6 can thus be removed or omitted. They no longer contribute, as with earlier systems, to the sealing surfaces D and thus the region where these zones are omitted, from increased flow cross sections or larger passages for the material displaced.

In the embodiment illustrated, the edges 11 and 12 are parallel to one another. This corresponds to a preferred embodiment. However, as will be apparent from FIG. 9, the edges 11" and 12" flanking the sealing surface D" can be inclined with different inclinations to the axis.

In the embodiment of FIG. 4, the direction of inclination of the edges 11 and 12 is such that they contribute an additional component of force in the direction of displacement P of the material, this force component being represented by the arrow F in FIG. 4. This is, of course, the case when the worms 3 and 4 and hence and kneading units K are driven in the same sense.

In the embodiment of FIG. 7, the inclined edges 11 and 12 are inclined opposite to the inclination of FIG. 4 and here contribute a force component to the material which is opposite the direction of displacement represented by arrow F when the two kneading units are rotated in the same sense. The passages for the material here prevent shear peaks by the mixing effect is improved.

In the embodiment of FIG. 8, the polygon disks can have their sealing surfaces D' delimited by edges 11' and 12' which alternate in their direction of orientation. Depending on the number of disks, however, other combinations of orientation of the edges can be used. In every case, however, the kneading units K should have at least three circumferentially offset disks and preferably more than four and even more than five such disks.

I claim:

1. A double-worm extruder, comprising:
   a worm housing;
   a pair of mutually interengaging extrusion worms rotatable about respective parallel axes in the same sense in said housing for plastifying a plastic material and displacing said plastic material toward an extrusion end of said housing;
   a respective kneading unit along each of said worms and at substantially the same location along the respective worms, said kneading units each comprising:
   a plurality of polygonal disks disposed one adjacent another along the respective worm and rotatable therewith, each of said disks being formed with two diametrically opposite sealing surfaces juxtaposed with an inner surface of said housing and having an outer diameter corresponding substantially to an inner diameter of said inner surface at locations at which said sealing surfaces are juxtaposed therewith, said sealing surfaces extending generally in a circumferential direction of the respective worm and having edges generally transverse to axial directions of the worm and at least partly inclined to the axes of the respective worm; and
   means on said housing for driving said worms and said kneading units in the same sense, each of said sealing surfaces having two of said edges off parallel with respect to one another.

2. The double-worm extruder defined in claim 1 wherein said edges are inclined axially forwardly toward an extrusion head spaced axially apart from said driving means and are effective to advance said material along said housing.

3. The double-worm extruder defined in claim 1 wherein said edges are inclined axially rearwardly and are effective to displace said material in a direction opposite a direction of advance of said material by said worms.

4. The double-worm extruder defined in claim 1 wherein said edges are inclined axially alternately with respect to one another to advance said material along said housing and to displace said material in a direction opposite a direction of advance of said material by said worms.

5. The double-worm extruder defined in claim 4 wherein said polygonal disks are at least three in number for each unit.

6. The double-worm extruder defined in claim 5 wherein said polygonal disks are at least five in number for each unit.

7. The double-worm extruder defined in claim 6 wherein said polygonal disks of each unit are formed in one piece.

* * * * *